United States Patent [19]

Totani et al.

[11] 4,367,805

[45] Jan. 11, 1983

[54] GOVERNING CONTROL APPARATUS FOR AUTOMOBILES

[75] Inventors: Shinzo Totani, Nagoya; Takaaki Kato, Toyohashi; Yoshikazu Mizuno, Aichi; Munetaka Noda, Chiryu, all of Japan

[73] Assignee: Nippondenso Co., Ltd., Kariya, Japan

[21] Appl. No.: 203,147

[22] Filed: Nov. 3, 1980

[30] Foreign Application Priority Data

Nov. 26, 1979 [JP] Japan .................. 54-152639

[51] Int. Cl.³ .............................................. B60K 31/00
[52] U.S. Cl. .................................... 180/179; 123/361
[58] Field of Search ............... 180/175, 176, 177, 178, 180/179; 123/352, 361

[56] References Cited

U.S. PATENT DOCUMENTS 4,224,907  9/1980  Lefeuvre .................. 123/352
4,267,491  5/1981  Collonia .................. 180/179 X Primary Examiner—Joseph F. Peters, Jr.
Assistant Examiner—Michael Mar
Attorney, Agent, or Firm—Cushman, Darby & Cushman

[57] ABSTRACT

An apparatus for controlling the running speed of an automobile at a desired running speed includes a device for decreasing the range of acceleration control as the actual running speed approaches the desired value, and a biasing device which opposes the acceleration control tending to exceed the desired value.

5 Claims, 3 Drawing Figures

GOVERNING CONTROL APPARATUS FOR AUTOMOBILES

BACKGROUND OF THE INVENTION

The present invention relates to governing control apparatus for automobiles which assists the driver to drive the vehicle at a desired constant speed through his own speed governing operation, and more particularly the invention relates to an apparatus capable of ensuring the constant speed driving of the vehicle at a desired speed by a simple speed governing operation of the driver without entirely ruining the ordinary acceleration and deceleration functions by the driver.

Known as the techniques similar to the above type are automatic constant speed control apparatus. However, the known type of constant speed control apparatus is operated in response to the setting of a desired speed by the driver so that only when the control system is established, the automatic speed regulating element of the vehicle, such as, the position of the throttle valve is automatically regulated. As a result, each time the vehicle is to be accelerated or decelerated, the control system must be cancelled, and the setting operation must be performed again when it is desired to start the constant speed operation again. Thus, due to its complexity of operation, the utility of the apparatus is very low except when the vehicle is running on an expressway or the like.

SUMMARY OF THE INVENTION

With a view to overcoming the foregoing deficiencies, it is the object of the present invention to provide an automobile governing control apparatus of the type including actuating means adapted to be operated by the driver for speed governing purposes, wherein when the running speed of the vehicle exceeds a desired speed set arbitrarily, the operating load applied to the actuating means is increased, whereby the driver operates the actuating means under a low load such that the actuating means is always operated continuously up to the maximum operating position just before the point of increasing the operating load opposing the movement of the actuating means, thus maintaining the speed of the vehicle at any desired value, making it possible to bring the vehicle into the ordinary deceleration operation from the said operation and also making an acceleration operation in excess of the desired speed by further increasing the operating load against the service load.

In accomplishing the above object, the governing control apparatus provided in accordance with the present invention includes load adjusting means operatively coupled to the actuating means, whereby the operating load opposing the movement of the actuating means in the accelerating direction is increased by the load adjusting means, and also the starting point of the movement limiting action is controlled by electric control means in accordance with the difference between the actual vehicle speed and the desired vehicle speed.

DESCRIPTION OF THE PREFERRED EMBODIMENT

The present invention will now be described in greater detail with reference to the illustrated embodiment.

Figure 1:
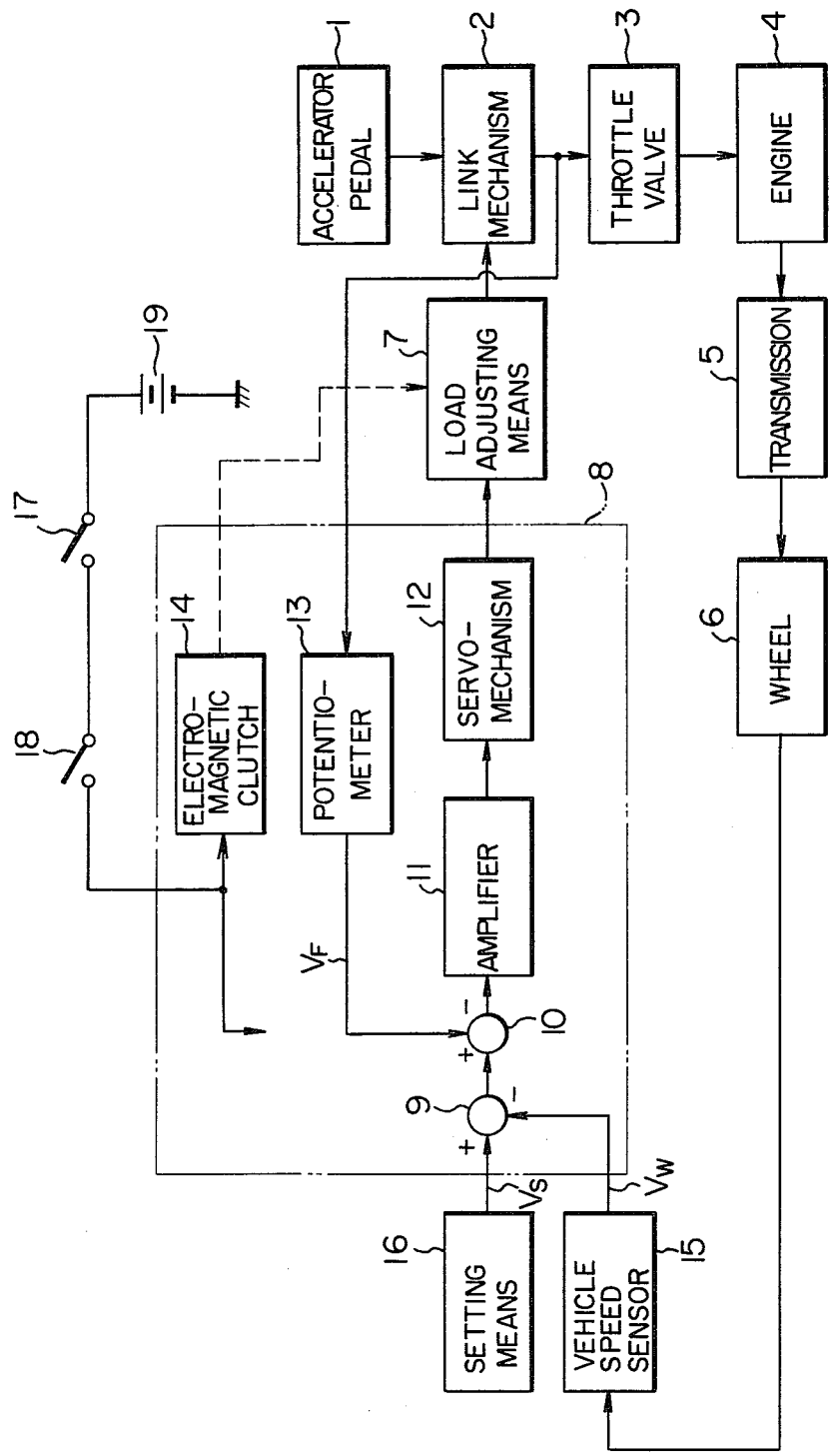
FIG. 1 is a block diagram showing the entire control system in an embodiment of a governing control apparatus according to the present invention.

Referring to FIG. 1 showing the entire control system in an apparatus of this invention, an accelerator pedal 1 forming actuating means is operatively linked to an engine carburetor throttle valve 3 by a link mechanism 2, and these means 1, 2 and 3 form a known type of governor unit for regulating the rotational speed of an automobile driving engine 4. The torque produced on the combustion stroke of the engine 4 is adjustable by the governor unit and the torque is transmitted to wheels 6 by way of a transmission 5 to regulate the running speed of the vehicle.

The link mechanism 2 is coupled to load adjusting means 7 which is operatively associated with an electric control unit 8 and the operating load of the accelerator pedal 1 is varied in a stepwise fashion by the load adjusting means 7. More specifically, the load adjusting means 7 is designed so that an extra spring force is applied to the load adjusting means 7 when it is moved in a direction to accelerate the vehicle, and moreover the application starting position of this spring force is adjustable by the electric control unit 8.

The electric control unit 8 is responsive to a deviation derived from a signal voltage $V_W$ corresponding to the running speed of the vehicle or the rotational speed of the wheels 6, a signal voltage $V_S$ corresponding to the desired running speed and a signal voltage $V_F$ produced by negative feedback and corresponding to the amount of adjustment of the throttle position by the governor unit so as to regulate the spring force application starting point. The electric control unit 8 mainly comprises adder circuits 9 and 10 for deriving a deviation from the signal voltages $V_W$, $V_S$ and $V_F$, a deviation amplifier circuit 11, a servomechanism 12 and a potentiometer 13 forming a feedback means, and the control unit 8 forms a feedback control system. This control system is essentially the same as the one used in the known automatic constant speed control apparatus. A sensor 15 and setting means 16 are also of the same type as used in the known apparatus and they respectively generate the signal voltage $V_W$ corresponding to the rotational speed of the wheels 6 and the signal voltage $V_S$ corresponding to the set desired running speed.

The electric control unit 8 comes into operation in response to the supply of power from a vehicle battery power source 19 upon closing of an ignition switch 17 and an actuation switch 18 for actuating the apparatus. The control unit 8 includes an electromagnetic clutch 14 forming energizing means for substantially establishing an operative coupling between the load adjusting means 7 and the link mechanism 2 when the apparatus is brought into operation, and the operative coupling between the load adjusting means 7 and the link mechanism 2 is positively prevented when the apparatus is not in operation.

Figure 2:
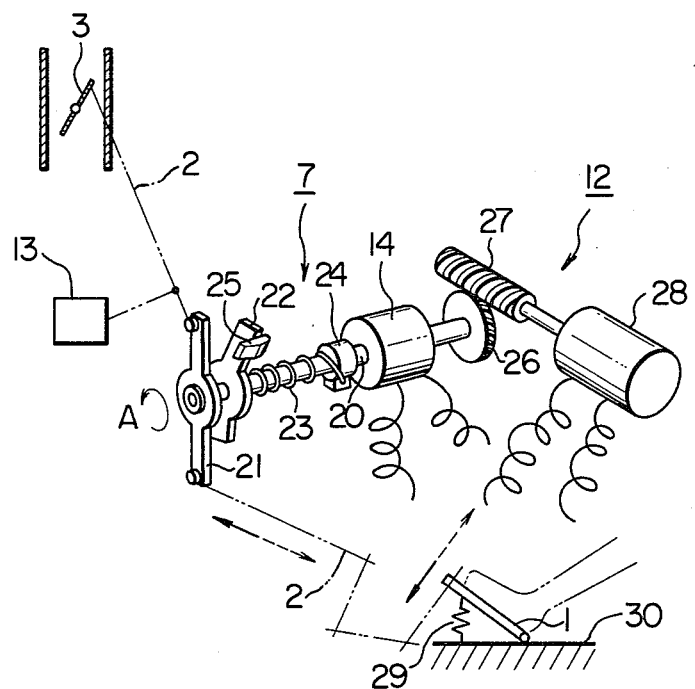
FIG. 2 is a perspective view showing the condition in which the governing mechanism is connected to the load adjusting means in the embodiment of FIG. 1.
Figure 3:
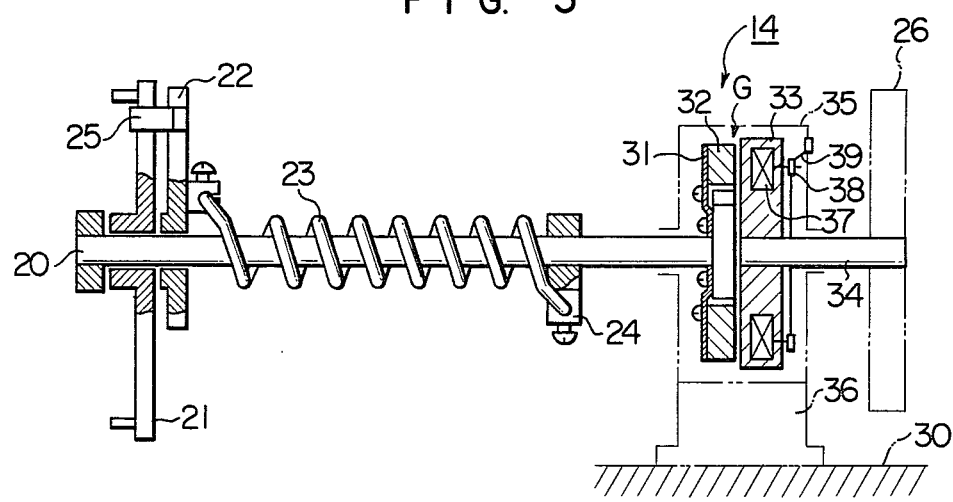
FIG. 3 is a partially sectional front view of the load adjusting means and the electromagnetic clutch in the embodiment of FIG. 1.

The operative coupling relation between the governor unit and the load adjusting unit 7 is shown in FIGS. 2 and 3. Disposed between the members of the link mechanism 2 operatively interconnecting the accelerator pedal 1 and the throttle valve 3 is a first rotary plate 21 which is rotatable about a drive shaft 20. Also rotatably mounted on the drive shaft 20 is a second rotary plate 22 whose rotary movement is limited by a hairspring 23 having its one end fastened to the drive shaft 20 by fastening means 24. The second rotary plate 22 is adapted for abutment upon the side end of the first rotary plate 21 and it includes an integral projection 25 adapted to serve as a stopper against the rotary movement of the plate 21 in the accelerating direction. Thus, the projection 25 applies or loads the spring force of the hairspring 23 onto the accelerator adjusting mechanism. The spring force of the hairspring 23 is about 20 Kg as compared with the spring force of a return spring 29 of the accelerator pedal 1 which is usually on the order of several Kg, and the hairspring 23 is such that its spring force acts only in connection with the movement of the accelerator pedal 1 in the accelerating direction and its application starting position is dependent on the rotational angle of the drive shaft 20. The drive shaft 20 is coupled to a worm gear 26 by way of the electromagnetic clutch 14 so that when the electromagnetic clutch 14 is energized, the rotational angle of the drive shaft 20 is determined by a servomotor 28 through a worm 27 and the worm gear 26.

The electromagnetic clutch 14 is of a known construction and it comprises a clutch plate 32 which is mounted on the drive shaft 20 and held in place by a leaf spring 31, and energizing means 33 spaced from the clutch plate 32 by a gap G and adapted to move along with a gear shaft 34 of the worm gear 26 as a unit. An electromagnetic clutch housing 35 rotatably supports the shafts 20 and 34 and it is secured to a vehicle body 30 by a bracket 36. Electric brushes 39 are attached to the inner side of the housing 35 so as to apply an energizing current to an electromagnetic coil 37 through the electric brushes 39 and slip rings 38 (the other electric brush and slip ring are not shown).

With the construction described above, the operation of the governing control apparatus for automobiles is as follows. When the ignition switch 17 is closed so that the vehicle comes into the normal operation, the movement of the accelerator pedal 1 is transmitted to the throttle valve 3 through the link mechanism 2 and the first rotary plate 21. At this time, the operating load of the accelerator pedal 1 is mainly comprised of the spring force of the return spring 29. As a result, the output torque of the engine 4 is varied in accordance with the ordinary movement of the accelerator pedal 1 and thus the running speed of the vehicle is varied by the will of the driver.

Then, when the actuation switch 18 is closed, the electric control unit 8 comes into operation. In other words, the electromagnetic clutch 14 is energized so that the drive shaft 20 is coupled with the worm gear 26 and the rotational angle of the drive shaft 20 is adjusted by the previously mentioned feedback control system. Thus the second rotary plate 22 is rotated along with the drive shaft 20 through the hairspring 23. By virtue of the operation of the feedback control system, the rotational angle of the second rotary plate 22 is controlled in accordance with the difference between the actual running speed and the desired speed set by the setting means 16.

Where the amount of depression of the accelerator pedal 1 is insufficient so that the second rotary plate 22 is not pressed against the first rotary plate 21, the second rotary plate 22 indicates the desired throttle position for bringing the vehicle to the desired speed. When the accelerator pedal 1 is depressed in the accelerating direction so that the running speed of the vehicle comes near to the desired running speed, as the running speed approaches the desired speed the second rotary plate 22 is rotated in the direction of an arrow A, thus reducing the range of rotary movement in which the first rotary plate 21 is freely movable by the accelerator pedal 1. When the accelerator pedal 1 is depressed further so that the projection 25 abuts against the first rotary plate 21, if the depressing force is less than the spring force of the hairspring 23, the position of the throttle valve 3 is adjusted to the opening determined by the rotational angle of the second rotary plate 22. In other words, the vehicle is brought into a constant speed operation so that the running speed is maintained at the desired speed as long as the accelerator pedal 1 is depressed suitably. In this case, if the depressing force on the accelerator pedal 1 is reduced, the return spring 29 moves the throttle valve 3 in a direction to decrease its opening. In other words, not only the accelerating operation for attaining the desired running speed but also the operation for decelerating the speed below the desired speed can be effected freely.

At the above-mentioned constant speed operation, if the depressing force on the accelerator pedal 1 is increased further, the second rotary plate 22 is moved against the spring force of the hairspring 23 independently of the drive shaft 20. In other words, the opening of the throttle valve 3 is increased further, thus allowing the acceleration operation beyond the desired running speed.

The present invention is not intended to be limited to the above-described embodiment and many changes and modifications are possible if necessary. For example, in the case of the load adjusting means 7 which operatively couples the servomechanism 12 with the link mechanism 2, the hairspring 23 may be replaced with any other type of spring means adapted to resiliently couple the output drive shaft 20 of the electromagnetic clutch 14 with the second rotary plate 22. Further, the electromagnetic clutch 14 may be replaced with means including a solenoid which is mounted integrally with the second rotary plate 22 so as to move the prejection 25 forward and backward. Further, by providing a clutch mechanism which couples the first rotary plate 21 with the second rotary plate 22 or the output drive shaft 20 by electromagnetic means or the like, it is possible to effect the conventional constant speed control by engaging the clutch mechanism as occasion demands.

It will thus be seen from the foregoing that in accordance with the present invention, by virtue of the fact that the desired constant speed driving can be accomplished by a simple speed governing operation without the need to set and cancel the constant speed control each time the acceleration or deceleration is effected and that the acceleration can be advanced beyond the set desired running speed, there is a great advantage that the apparatus of this invention can be used even on a jammed road, that there is no danger of accidentally increasing the speed and that there is the effect of improving the fuel consumption and ensuring safe driving.

We claim:
1. A governing control apparatus for an automotive vehicle comprising:
   vehicle speed adjusting means for controlling the speed of an engine of said vehicle so as to control the running speed of said vehicle;

actuating means adapted for control by a vehicle operator for operating said speed adjusting means;

vehicle speed sensing means for sensing the actual running speed of said vehicle;

setting means for setting a desired running speed of said vehicle; and load adjusting means responsive to said vehicle speed sensing means and to said setting means for applying to said actuating means a counter-force which opposes and limits movement of said actuating means in a direction to accelerate said vehicle when said running speed sensed by said sensing means reaches said desired running speed, wherein said load adjusting means comprises:

a drive shaft;

an intermediate first movable member rotatably mounted on said drive shaft for transmitting a movement of said actuating means to said speed adjusting means;

a second movable member rotatably mounted on said drive shaft and disposed to come into and out of engagement with said first movable member for limiting a range of movement of said first movable member in the direction to accelerate said vehicle;

control means responsive to said actuating means, said vehicle speed sensing means and said setting means for moving said second movable member to variably control the movement limiting position thereof so that the running speed of said vehicle is adjusted to said desired running speed, electromagnetic clutch means for transmitting a drive output of said control means to said second movable member by way of said drive shaft; and spring means mounted on said drive shaft for applying a limiting force opposing the rotary movement of said second movable member adapted to be engaged with and rotated by said first movable member.

2. In an automotive vehicle speed governing control apparatus including governing means responsive to an operation of actuating means to regulate an amount of movement of means for adjusting the speed of an automotive vehicle, the improvement comprising:

vehicle speed sensing means for sensing the running speed of said vehicle;

setting means for setting a desired running speed of said vehicle;

load adjusting means operatively coupled to said actuating means for limiting the movement of said actuating means so as to increase an operating load opposing the movement of said actuating means in a direction to accelerate said vehicle, a position of said load adjusting means at which said limiting action is started in a range of movement of said actuating means being substantially variable; and electric control means responsive to a detection signal from said vehicle speed sensing means and a set speed signal from said setting means such that said limiting action starting position is brought substantially near to a deceleration range in said range of movement of said actuating means as a running speed of said vehicle indicated by said detection signal approaches the desired running speed indicated by said set speed signal wherein said load adjusting means comprises:

electromagnetic clutch means;

drive shaft means disposed to be rotated in response to an output of said electric control means through said clutch means;

a first plate member rotatably mounted on said drive shaft means to transmit a movement of said actuating means to said speed adjusting means;

a second plate member rotatably mounted on said drive shaft means to come into and out of engagement with said first plate member for limiting a range of accelerating movement of said first plate member; and spring means mounted on said shaft means for applying to said second plate member disposed to be engaged with and rotated by said first plate member a limiting force opposing the rotary movement of said second plate member.

3. A governing control apparatus for an automotive vehicle comprising:

vehicle speed sensing means for sensing a running speed of an automotive vehicle and generating an actual vehicle speed signal indicative thereof;

speed setting means for establishing a desired running speed and generating a desired speed signal indicative thereof;

means for sensing an amount of movement of movable means of said vehicle which controls its engine rotational speed and generating a speed adjustment signal indicative thereof actuating means adapted to be coupled to said movable means of said vehicle for moving said movable means to accelerate or decelerate the engine rotational speed and the running speed of said vehicle;

load adjusting means for decreasing a range of accelerating movement of said actuating means as the actual vehicle speed approaches said desired speed, said load adjusting means including biasing means for opposing an operation by the vehicle operator of said actuating means tending to accelerate said vehicle beyond said desired running speed;

servo means responsive to said actual vehicle speed signal said desired speed signal and said speed adjustment signal for driving said load adjusting means; and clutch means for bringing said servo means and said load adjusting means into and out of engagement with each other.

4. A speed control apparatus for automotive vehicles comprising;

an acceleration pedal;

a throttle valve mechanically and operatively linked with said acceleration pedal, for controlling the supply of fuel or air to an engine of an automotive vehicle in accordance with a depression of said acceleration pedal during a normal running operation of said vehicle;

load adjusting means operatively connected between said acceleration pedal and said throttle valve;

a vehicle speed sensor for sensing the running speed of said vehicle;

setting means for setting a desired speed of said vehicle;

a switch for actuating said speed control apparatus upon being closed when a constant speed running of said vehicle is desired;

an electric control circuit, energized when said actuation switch is closed, for comparing the running speed of said vehicle sensed by said vehicle speed sensor with said desired speed and controlling said load adjusting means responsive thereto;
wherein said load adjusting means includes:
  driving means electrically connected to said electric control circuit and having an output shaft;
  a rotary shaft;
  clutch means connecting said output shaft with said rotary shaft when said actuation switch is closed;
  a first rotary element rotatably supported on said rotary shaft and connected to said acceleration pedal and said throttle valve for transmitting the movement of said acceleration pedal to said throttle valve;
  a second rotary element rotatably supported on said rotary shaft and having a stopper projection engageable with a portion of said first rotary element;
  spring means connected at its one end to said second rotary element and at its other end to said rotary shaft;
  said electric control circuit comparing the running speed of said vehicle with said desired speed when said actuation switch is closed, and actuating said driving means to rotate said second rotary element to a position corresponding to said desired speed;
  said first rotary element being rotated in response to the depression of said acceleration pedal in a direction of increasing the running speed of said vehicle, and the portion of said first rotary element being engaged with said stopper projection of said second rotary element when the running speed of said vehicle reaches said desired speed,
  said first rotary element being further rotated with said second rotary element in the direction of increasing the running speed of said vehicle when a rotating force transmitted from said acceleration pedal to said first rotary element is greater than a spring force of said spring means.

5. In an apparatus for controlling the speed of a vehicle wherein the vehicle operator depresses accelerator pedal means in a first direction against a first bias for accelerating the vehicle and allows the pedal means to be moved in a second direction, opposite to said first direction, under the action of said first bias for decelerating the vehicle, the improvement comprising:
  means for setting a desired vehicle speed;
  means for determining an actual vehicle speed; and
  means responsive to said setting means and said determining means for providing a second bias to said accelerator pedal means for accelerator pedal positions corresponding to vehicle speeds greater than said desired vehicle speed such that in order to accelerate the vehicle to a speed greater than the desired vehicle speed, the operator must depress the accelerator pedal means against both the first bias and the second bias.

* * * * *